Patented Aug. 7, 1934

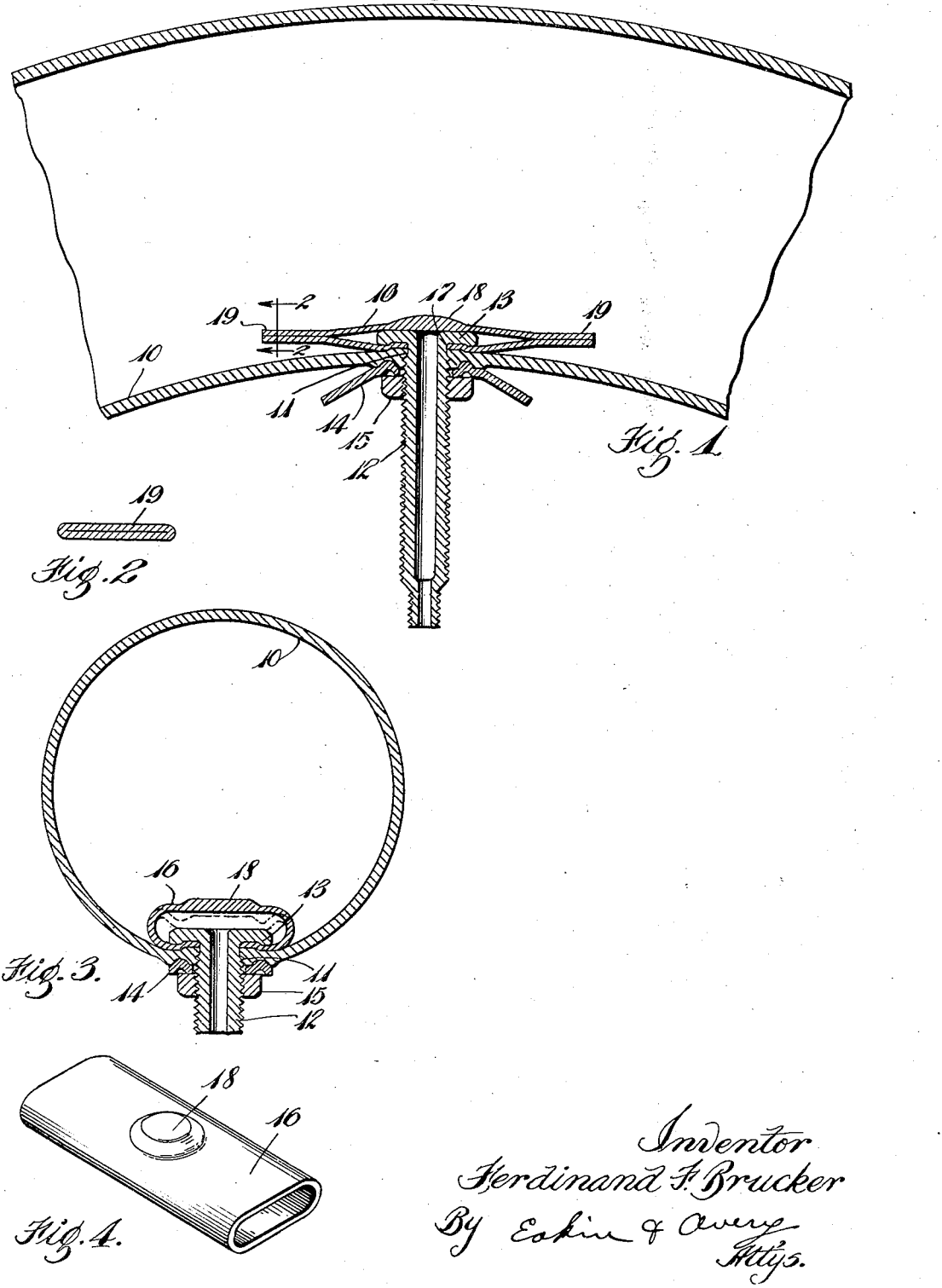

1,969,118

UNITED STATES PATENT OFFICE 1,969,118

VALVE FOR INFLATABLE ARTICLES

Ferdinand F. Brucker, Akron, Ohio, assignor to The B. F. Goodrich Company, New York, N. Y., a corporation of New York Application August 2, 1933, Serial No. 683,271

2 Claims. (Cl. 152—12)

This invention relates to valves for inflatable articles and is especially useful in the construction of inner tubes for pneumatic tires.

The principal objects of the invention are to provide simplicity of construction and efficiency of operation.

Other objects will appear from the following description and the accompanying drawing.

In the drawing:

Fig. 1 is a longitudinal sectional view of the portion of an inner tube to which the valve is attached.

Fig. 2 is a cross section of the valve taken on line 2—2 of Fig. 1.

Fig. 3 is a lateral sectional view of a modified form of the device as applied to an inner tube.

Fig. 4 is a perspective view of the rubber part of the valve shown in Fig. 3.

Referring to the drawing, the numeral 10 designates an inner tube of resilient soft rubber formed with an aperture 11 through which a tubular valve stem 12 extends, the valve stem being formed with a head 13 larger than the aperture. A spreader washer 14 and a nut 15 are passed over the stem to seal the tube thereabout, the nut being engaged by suitable threads on the stem.

In the form of the invention shown in Figs. 1 and 2 a flexible rubber tube 16 of oval cross section is provided with an opening 17 in one of its flat sides. The side of the tube 16 around the opening engages under the head 13 which holds it in seated engagement with the wall of the inner tube. The opposite side of the tube 16 extends across the head 13 of the valve tube normally in contact therewith to close the same. The wall of the tube 16 is thickened as at 18 where it overlies the valve stem head 13 so as to prevent rupture of the wall over the aperture. The ends of the tube 16 are flattened as at 19 so as normally to have its sides in contact with each other. This construction provides a doubly sealed valve. Air admitted through the stem 12 under pressure raises the thickened wall 18 and opens the flattened ends of the flexible tube, permitting air to enter the inner tube. When the inflating hose is removed from the stem 12, the pressure in the inner tube closes the flattened ends of the tube 16 and forces the reinforced side 18 against the head 13.

As the tube 16 lies along the inner side of the inner tube, it is protected by the flanking beads of the tire even when the tire is run flat.

The modified form illustrated in Figs. 3 and 4 is substantially the same as that shown in Figs. 1 and 2 except that the tube 16 is not flattened at its ends and sealing of the thickened wall 18 against the head 13 is depended upon to seal the tire.

The valve construction in any of its forms is free from springs and other delicate parts and the stem is more simple in construction than valve stems ordinarily used. The flexible rubber valve elements may be produced at low cost by the manufacturer of the inner tube.

I claim:

1. The combination with the inflatable inner tube of a pneumatic tire, of a flexible normally flattened open-ended rubber valve tube therein having a side opening in one of its flat sides, a rigid valve stem having a flanged head located within said valve tube, said stem extending through said side opening and through the wall of the inner tube, and means for clamping said valve tube to said inner tube with the axes of the tubes parallel to each other, the ends of the valve tube extending beyond the flanged end of the stem and being adapted to be sealed by flattening under the influence of air pressure in the inner tube.

2. The combination defined by claim 1, in which the wall of the valve tube opposite the head of the valve stem is reinforced.

FERDINAND F. BRUCKER.